United States Patent [19]

Roeckel et al.

[11] 4,328,175
[45] May 4, 1982

[54] APPARATUS FOR CONTACTING A LIQUID WITH A GAS

[75] Inventors: Winfried Roeckel, Taunusstrasse, Fed. Rep. of Germany; Carl Scaccia, Wellsville; John A. Conti, Neuberg-Ravolz of N.Y.

[73] Assignee: Union Carbide Corporation, Danbury, Conn.

[21] Appl. No.: 81,041

[22] Filed: Oct. 2, 1979

[51] Int. Cl.³ .............................................. B01F 3/04
[52] U.S. Cl. ...................................................... 261/91
[58] Field of Search .................................... 261/93, 91

[56] References Cited

U.S. PATENT DOCUMENTS

| | | |
|---|---|---|
| 366,991 | 7/1887 | Andrews . |
| 1,740,441 | 12/1929 | Ghogo . |
| 2,082,759 | 6/1937 | Walker . |
| 2,128,311 | 8/1938 | Mertes . |
| 2,232,388 | 2/1941 | Ingalls et al. . |
| 2,244,902 | 6/1941 | Stich . |
| 2,293,183 | 8/1942 | Walker . |
| 2,295,391 | 9/1942 | Durdin, Jr. . |
| 2,461,746 | 2/1949 | Lathrop et al. . |
| 2,628,827 | 2/1953 | Daman . |
| 3,666,103 | 5/1972 | Green . |
| 3,807,708 | 4/1974 | Jones . |
| 3,846,516 | 11/1974 | Carlson . |
| 3,940,461 | 2/1976 | Martin et al. .......................... 261/91 |
| 3,976,453 | 8/1976 | Brown . |
| 4,018,598 | 4/1977 | Markus . |
| 4,145,383 | 3/1979 | Randall . |
| 4,150,900 | 4/1979 | Smith, Jr. . |
| 4,259,267 | 3/1981 | Wang ..................................... 261/93 |

FOREIGN PATENT DOCUMENTS 2350467 4/1975 Fed. Rep. of Germany ........ 261/91
548664 10/1942 United Kingdom .

OTHER PUBLICATIONS

WPCF Manual of Practice No. 5, "Aeration in Waste Water Treatment", Lancaster Press, Inc., 1971, p. 50.

Primary Examiner—Tim R. Miles
Attorney, Agent, or Firm—Saul R. Bresch

[57] ABSTRACT

Apparatus for contacting a liquid, in a tank containing a body of same, with a gas from a gas space overlying the body of liquid. A generally tubular draft member is disposed in the tank, having a cylindrical main body portion and an outwardly flared conical inlet upper section forming a liquid inlet at its upper end. Enclosing walls of the conical inlet section form an angle with the draft member central axis of from 5° to 35° and the conical inlet section has a vertical height of from 0.25 to 1.25 times diameter of the draft member. A rotatable axial pumping impeller is provided in the draft member for rotational vortex entrainment of gas in downwardly flowing liquid pumped through the draft member. Baffle means are positioned in the conical inlet section of the draft member to prevent bulk rotation of liquid in the tank during rotation of the impeller.

3 Claims, 1 Drawing Figure

U.S. Patent      May 4, 1982      4,328,175
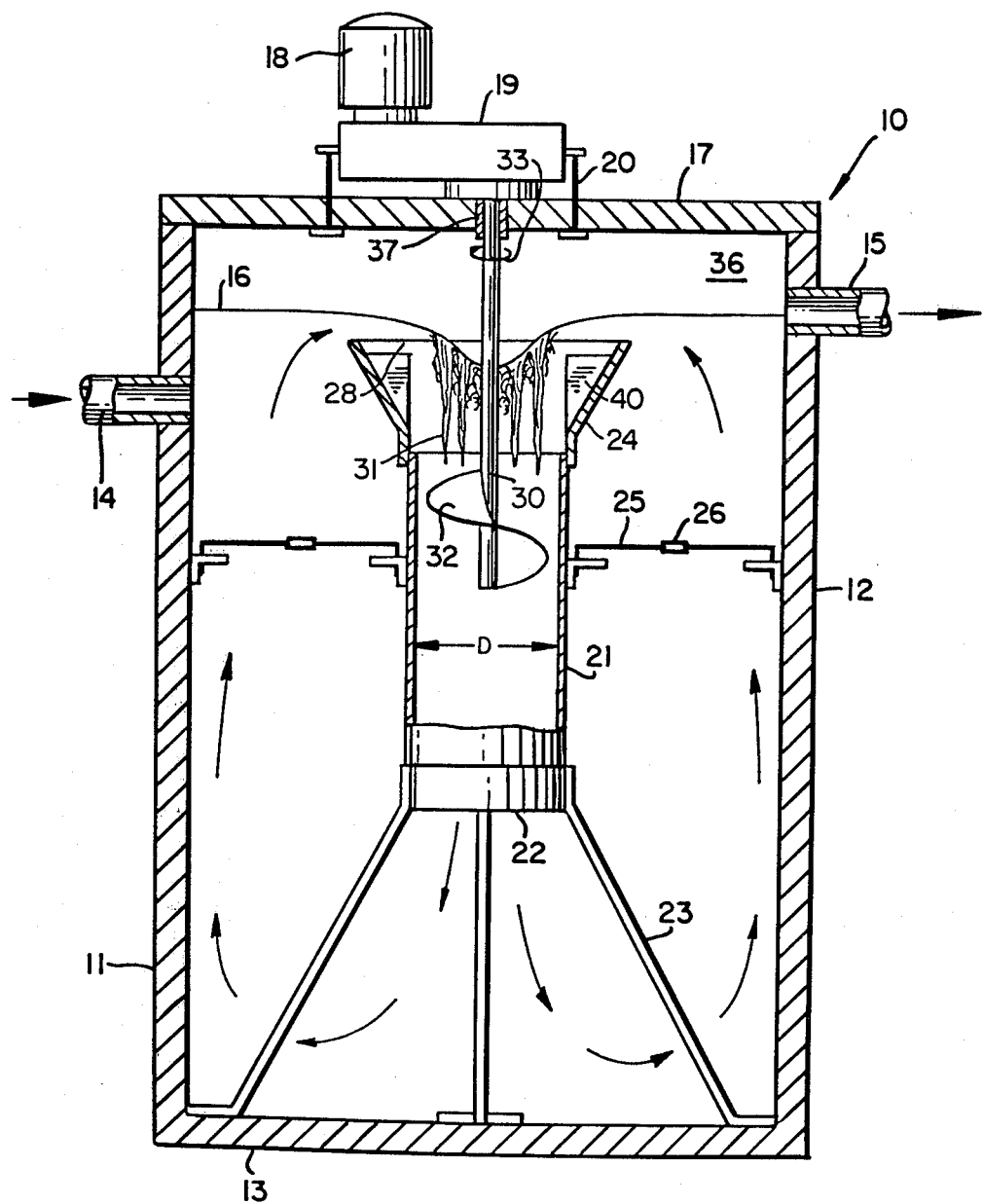

APPARATUS FOR CONTACTING A LIQUID WITH A GAS

BACKGROUND OF THE INVENTION

1. Field of the Invention

This invention relates to apparatus for contacting a liquid, in a tank containing a body of same, with a gas from a gas space overlying the body of liquid.

2. Description of the Prior Art

In the field of gas-liquid contacting, and in particular activated sludge sewage treatment, three general types of aeration devices have been widely employed in practice: submerged porous diffusers, submerged turbines, and surface aerators.

Although submerged diffusers represent the simplest apparatus design, surface aerators have become the most widely used of the basic sewage aeration devices. High efficiency and minimal operational complexity are probably the major reasons behind the popularity of the surface aerator. It is well known, however, that the highest efficiencies are achieved with surface aerators at low rotational speeds, typically below 100 rpm. Since commercially available drive motors typically operate at high rotational speeds, efficient operation of a surface aerator requires the use of a large, heavy and complex gear reduction unit. The need for this gear reduction unit increases both the capital and operating cost of the overall aeration system.

Accordingly, it is an object of the present invention to provide an aeration device that possesses the simplicity of the surface aerator while exhibiting optimum performance characteristics at higher rotational speeds than are employed with surface aerators.

Other objects and advantages of the present invention will be apparent from the ensuing disclosure and appended claims.

SUMMARY OF THE INVENTION

This invention relates to apparatus for contacting a liquid, in a tank containing a body of same, with a gas from a gas space overlying the body of liquid.

The apparatus includes a generally tubular draft member oriented with its central axis aligned vertically, having a cylindrical main body portion and an outwardly flared conical inlet upper section positioned in the tank with the upper end of the conical inlet section forming a liquid inlet positioned proximate to but beneath the normal liquid level in the tank. The lower end of the draft member is vertically spaced from the bottom of the tank to form a liquid outlet. Enclosing walls of the conical inlet section form an angle with the draft member central axis of 5° to 35° and the conical inlet section has a vertical height of from 0.25 to 1.25 times the diameter of the draft member.

A rotatable axial pumping impeller is employed which has a diameter which is smaller than but at least 90% of the diameter of the draft member. The rotatable axial pumping impeller is positioned in the draft member proximate the juncture of the conical inlet section and the cylindrical main body portion of the draft member for axial downflow pumping of liquid through the draft member and inducement of circulation of liquid discharged from the draft member liquid outlet through the body of liquid in the tank to the draft member liquid inlet.

Means are provided for rotating the impeller so as to create a plurality of gas vortices within the conical inlet section of the draft member for vortex entrainment of gas in the downwardly flowing liquid pumped through the draft member.

Baffle means are positioned in the conical inlet section of the draft member above the impeller to prevent bulk rotation of the body of liquid in the tank during rotation of the impeller means while permitting the formation of a liquid vortex extending downwardly toward the impeller means for the vortex entrainment of gas, to effect the gas-liquid contacting.

As used herein, the phrase "normal liquid level" means the liquid level in the tank when the aeration apparatus is not in operation.

BRIEF DESCRIPTION OF THE DRAWINGS

FIG. 1 is a sectional, elevational view of an aeration apparatus according to the present invention.

DESCRIPTION OF THE PREFERRED EMBODIMENT

Referring to FIG. 1, there is illustrated a preferred embodiment of the present invention. The apparatus includes an aeration tank 10, comprising side walls 11 and 12 and a floor 13, which is filled with liquid to be aerated to a level 16 via inlet conduit 14. Aerated, treated fluid is withdrawn from the aeration tank 10 through conduit 15. Across the top of the aeration tank 10 is a bridge 17 on which the motor 18 and gear reduction unit 19 are supported. The motor and gear reduction unit are affixed to bridge 17 through connections 20. Since the rotating speed of the output shaft is optimized in a much higher range than prior art surface aeration devices, the gear ratio can be reduced allowing significant savings in the weight, size and cost of the gear reduction unit 19.

The shaft member 30 is connected to the gear reduction unit through bushing 37 in the bridge 17. An axially discharging impeller 32 is connected to the lower end of the shaft member 30. In this embodiment the impeller is a helical screw impeller, although in the broad practice of the present invention the impeller means may suitably comprise a member selected from the group consisting of helical screw impellers, pitched blade turbines, and marine impellers. The shaft/impeller combination is supported within the tank inside a draft member 21. The draft member is supported in the tank by means of support struts 23 and a collar at its lower end and by means of side support members 25 at its intermediate portion. The tension on the side support means can be adjusted by adjusting means 26. In this embodiment, the draft member 21 extends from just above the top of the helical impeller down within the tank to near the vessel mid-point.

The draft member 21 is generally tubular in form and is oriented with its central axis aligned vertically. The draft member comprises a cylindrical main body portion and an outwardly flared conical inlet upper section 24 positioned in the tank with the upper end of the conical section forming a liquid inlet positioned proximate to but beneath normal liquid level in the tank. The lower end of the draft member is vertically spaced from the bottom of the tank to form a liquid outlet 22. Enclosing walls of the conical inlet section of the draft member form an angle with the draft member central axis of from 5° to 35°. The conical inlet section has a vertical height of from 0.25 to 1.25 times the diameter D of the draft member, i.e., diameter of the cylindrical body portion.

Rotatable axial pumping impeller 32 is employed having a diameter which is smaller than but at least 90% of the diameter of the draft member, and is positioned in the draft member proximate to the juncture of the conical inlet section and the cylindrical main body portion of the draft member.

In operation, the shaft member 30 is rotated in the direction shown by arrow 33 at a sufficient rate of speed by means of the motor 18 and gear reduction unit 19 so as to depress the liquid level in the conical inlet section 24. The liquid assumes a vortical shape, extending from the liquid surface down into the inlet section. A plurality of gas vortices 31 are formed extending from the surface of the liquid to the impeller 32. Liquid flowing into the main portion of the draft member surrounding the impeller 30, entrains gas bubbles from these gas vortices. The gas drawn into the liquid is then pumped with the liquid down through the draft member 21 by means of impeller 32. To ensure that a gross vortical movement of liquid within the vessel 10 propagated from the inlet 24 is not caused by rotation of the impeller 32, inlet guide baffle means 40 are provided in the inlet section 24. Typically, 2 to 4 baffles are provided symmetrically spaced around the inlet section. For maximum effectiveness, each baffle is set in a radial plane with respect to the draft member.

In addition to relying on gas entrainment from the numerous gas vorticies induced by the rotating axial flow impeller, this invention also takes advantage of another entrainment mechanism which will be termed vortical cascade. As the speed of the impeller is increased, the degree of liquid depression within the inlet section 24 also increases. As soon as the liquid funnel grows to a certain limit, the free surface at the inlet section breaks up. The liquid violently cascades toward the center of the funnel and entrains gas from the gas space as would a waterfall. The gas/liquid mixture thus formed is then pumped downwardly by the impeller and is thereafter discharged from the bottom of the draft member. The actual rotational speed where both gas vortices and vortical cascade are formed will depend on a variety of design factors. The optimum speed, however, will typically lie above about 200 rpm.

To ensure an effective downward pumping of the two-phase gas-liquid mixture, the impeller must have a diameter substantially equal to the diameter D of the draft member. Quantitatively, this means that the impeller must have a diameter of at least 90% of the draft member diameter. When the relationship between the impeller and the diameter is below this limit, there is sufficient clearance between the impeller and the draft member wall to permit gas which has previously been pumped by the impeller to rise upwardly past the impeller along the wall of the draft member. This gas is subsequently re-entrained by the impeller. Since any impeller has well-defined operating characteristics with respect to the pumping of a two-phase mixture, any re-entrainment of previously pumped gas will serve to detrimentally affect the quantity of fresh gas that can be entrained by the device. The eventual result is a drastic reduction in overall mass transfer capabilities of the aeration system.

The present invention requires an outwardly flared conical inlet section forming an angle with the draft member central axis of from 5° to 35° and with a vertical height of between 0.25 and 1.25 times draft member diameter. The conical inlet section serves several essential functions. First, it minimizes adverse inlet turbulence by allowing gradual and essentially uniform increase in liquid flow velocity to the center portion of the draft member inlet, at which point the vortical cascade occurs. Transient turbulence surges disrupting the uniformity of the flow would greatly reduce the pumping efficiency of the impeller means. Second, by flaring the inlet of the draft member, the flow area into the draft member is increased. As a result, the liquid flow velocity at the conical inlet section is lower than it is for a cylindrical inlet under similar operating conditions. This allows the system to be optimized at a higher speed with concomitant savings in the gear reduction unit of the system. The conical inlet also makes it easier to stabilize the vortical cascade above the impeller. This is important since it has been found that vortex formation extending down to the impeller should be avoided as it greatly increases power consumption. Conical inlet heights above 1.25 times the draft member diameter necessitate excessive power inputs in order to form and sustain both the gas vortices and the vortical cascade, while conical inlet heights below 0.25 times the draft tube diameter result in adverse interference between the operation of the impeller and the stable maintenance of both the gas vorticies and the vortical cascade.

Although preferred embodiments of the invention have been described in detail, it will be appreciated that other embodiments are contemplated only with modifications of the disclosed features, as being within the scope of the invention.

What is claimed is:

1. Apparatus for contacting a liquid, in a tank containing a body of same, with a gas from a gas space overlying said body of liquid, comprising:
    (a) a generally tubular draft member oriented with its central axis aligned vertically, having a cylindrical main body portion and an outwardly flared conical upper section positioned in said tank with the upper end of said conical inlet section forming a liquid inlet positioned proximate to but beneath normal liquid level in said tank and with the lower end of said draft member vertically spaced from the bottom of said tank to form a liquid outlet, wherein enclosing walls of said conical inlet section form an angle with the draft member central axis of from 5° to 35° and said conical inlet section has a vertical height of from 0.25 to 1.25 times the diameter of said draft member;
    (b) a rotatable axial pumping impeller having a diameter which is smaller than but at least 90% of the diameter of said draft member, positioned in said draft member proximate to the juncture of said conical inlet section and the cylindrical main body portion of said draft member, for axial downflow pumping of liquid through said draft member and inducement of circulation of liquid discharged from said draft member liquid outlet through said body of liquid in said tank to said draft member liquid inlet;
    (c) means for rotating said impeller at a speed above about 200 rpm so as to create a plurality of gas vortices within said conical inlet section of said draft member for vortex entrainment of gas in the downwardly flowing liquid pumped through said draft member; and
    (d) baffle means positioned in said conical inlet section of said draft member above said impeller to prevent bulk rotation of said body of liquid in said tank during rotation of said impeller while permitting the formation of a liquid vortex extending downwardly towards said impeller for said vortex entrainment of gas, to effect said gas-liquid contacting.

2. Apparatus according to claim 1 wherein said draft member inlet upper end is disposed between 0.25 and 1.25 times the draft member diameter beneath the normal liquid level in said tank.

3. Apparatus according to claim 1 wherein a plurality of baffle means are positioned in said conical inlet section of said draft member, with each baffle means being positioned in a radial plane with respect to said draft member.

* * * * *